(12) United States Patent
Sun et al.

(10) Patent No.: US 9,148,207 B1
(45) Date of Patent: *Sep. 29, 2015

(54) METHOD AND APPARATUS FOR ESTIMATING A CHANNEL QUALITY INDICATOR (CQI) FOR MULTIPLE INPUT MULTIPLE OUTPUT (MIMO) SYSTEMS

(71) Applicant: Marvell International Ltd., Hamilton (BM)

(72) Inventors: Yakun Sun, Sunnyvale, CA (US); Adina Matache, Redondo Beach, CA (US); Jungwon Lee, San Diego, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/157,485

(22) Filed: Jan. 16, 2014

Related U.S. Application Data

(63) Continuation of application No. 13/112,009, filed on May 20, 2011, now Pat. No. 8,644,262.

(60) Provisional application No. 61/346,828, filed on May 20, 2010.

(51) Int. Cl.
*H04W 4/00* (2009.01)
*H04B 7/04* (2006.01)

(52) U.S. Cl.
CPC ............ *H04B 7/0456* (2013.01); *H04B 7/0413* (2013.01)

(58) Field of Classification Search
CPC ..... H04W 72/04; H04W 72/05; H04W 72/06;
H04W 36/30; H04M 3/561; H04M 3/562;
H04M 3/563; H04L 47/10; H04L 47/11;
H04L 47/12; H04L 47/13
USPC ................. 370/252, 229, 333, 329, 465, 481;
375/260, 267, 227, 299; 455/69, 101
See application file for complete search history.

(56) References Cited

U.S. PATENT DOCUMENTS

2012/0182899 A1 7/2012 Mujtaba et al.
2012/0213310 A1 8/2012 Ko et al.

*Primary Examiner* — Dady Chery

(57) ABSTRACT

Systems and methods are provided for determining a channel quality indicator (CQI) in a transmission system associated with a diversity transmission scheme. A plurality of independent diversity branches are identified in the diversity transmission scheme. Each one of the independent diversity branches may correspond to a different portion of the effective channel and may include any suitable combination of frequency, time, and/or spatial components of the effective channel or of any wired or wireless paths or combinations of the same. An effective Signal-to-Noise Ratio (SNR) value is computed for each one of the identified independent diversity branches. The computed effective SNR values are combined for the identified independent diversity branches to generate a CQI value.

20 Claims, 10 Drawing Sheets

$$y(m) = \underbrace{\begin{bmatrix} e^{-j\frac{2\pi}{N_{FFT}}mk_1} \\ e^{-j\frac{2\pi}{N_{FFT}}mk_2} \\ \vdots \\ e^{-j\frac{2\pi}{N_{FFT}}mk_T} \end{bmatrix}}_{208} x(m) \underbrace{\begin{bmatrix} e^{-j\theta_1 m} \\ e^{-j\theta_2 m} \\ \vdots \\ e^{-j\theta_T m} \end{bmatrix}}_{209} x(m)$$

$$r(m) = [h_1(m)\; h_2(m)\; \cdots\; h_T(m)] \begin{bmatrix} e^{-j\theta_1 m} \\ e^{-j\theta_2 m} \\ \vdots \\ e^{-j\theta_T m} \end{bmatrix} x(m) + z(n) = \underbrace{\left(\sum_{i=1}^{T} h_i(m) e^{-j\theta_i m}\right)}_{214} x(m) + z(m)$$

FIG. 2A $$y(m) = \overbrace{W(m)D(m)U}^{252}x(m) \quad \text{251}$$

$$D(m) = \begin{bmatrix} e^{j\theta_1 m} & & & \\ & e^{j\theta_2 m} & & \\ & & \ddots & \\ & & & e^{j\theta_s m} \end{bmatrix} \quad \text{254}$$

$$U = \frac{1}{\sqrt{S}} \begin{bmatrix} e^{j\phi_{11}} & e^{j\phi_{12}} & \cdots & e^{j\phi_{1s}} \\ e^{-j\phi_{12}} & e^{j\phi_{22}} & & \\ \vdots & & \ddots & \\ e^{-j\phi_{1s}} & & & e^{j\phi_{ss}} \end{bmatrix} \quad \text{256}$$

FIG. 2B

$$\begin{bmatrix} y_1(2m) & y_1(2m+1) \\ y_2(2m) & y_2(2m+1) \end{bmatrix} = \frac{1}{\sqrt{2}} \begin{bmatrix} x(2m) & x(2m+1) \\ -x^*(2m+1) & x^*(2m) \end{bmatrix}$$

$$\begin{bmatrix} y_1(4m) & y_1(4m+1) & y_1(4m+2) & y_1(4m+3) \\ y_2(4m) & y_2(4m+1) & y_2(4m+2) & y_2(4m+3) \\ y_3(4m) & y_3(4m+1) & y_3(4m+2) & y_3(4m+3) \\ y_4(4m) & y_4(4m+1) & y_4(4m+2) & y_4(4m+3) \end{bmatrix} = \frac{1}{\sqrt{2}} \begin{bmatrix} x(4m) & x(4m+1) & 0 & 0 \\ 0 & 0 & x(4m+2) & x(4m+3) \\ -x^*(4m+1) & x^*(4m) & 0 & 0 \\ 0 & 0 & -x^*(4m+3) & x^*(4m+2) \end{bmatrix}$$

FIG. 3

METHOD AND APPARATUS FOR ESTIMATING A CHANNEL QUALITY INDICATOR (CQI) FOR MULTIPLE INPUT MULTIPLE OUTPUT (MIMO) SYSTEMS

CROSS-REFERENCE TO RELATED APPLICATIONS

This application is a continuation of U.S. patent application Ser. No. 13/112,009, filed May 20, 2011 (now U.S. Pat. No. 8,644,262) which claims benefit under 35 U.S.C. §119(e) of U.S. Provisional Application No. 61/346,828, filed May 20, 2010, each of which is hereby incorporated herein by reference in its entirety.

BACKGROUND OF THE INVENTION

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted as prior art against the present disclosure.

The disclosed technology relates to communication systems, and more particularly, to estimating a channel quality indicator (CQI) for multiple input multiple output (MIMO) systems that use transmit diversity schemes.

In a data transmission system, it is desirable for information, often grouped into packets, to be accurately received at a destination. A transmitter at or near the source sends the information provided by the source via a signal or signal vector. A receiver at or near the destination processes the signal sent by the transmitter. The medium, or media, between the transmitter and receiver, through which the information is sent, may corrupt the signal such that the receiver is unable to correctly reconstruct the transmitted information. Therefore, given a transmission medium, sufficient reliability is obtained through careful design of the transmitter and/or receiver, and of their respective components.

However, the transmitter may be unaware of how the channel will affect a transmitted signal, and may not be able to transmit information in a way that will be effective for a particular channel. For example, the transmitter may be a wireless router, where the channel varies depending on its surroundings. One technique to increase reliability when the transmitter does not have information about the channel is to use a CQI scheme to communicate channel conditions from the receiver to the transmitter. For example, a transmitter may transmit reference or pilot signals to the receiver. The receiver may process the received pilot signals to generate channel feedback information corresponding to the current conditions of the transmission channel. This feedback computed by the receiver may be referred to as Channel Quality Indicator (CQI) and may be based on any suitable channel parameter such as Signal-to-Interference and Noise Ratio (SINR), Signal-to-Noise Ratio (SNR), Signal-to-Noise plus Distortion Ratio (SNDR), power of received signal, supportable data rates, supportable modulation and/or coding rates, and supportable throughput. The receiver may then transmit the CQI information to the transmitter, e.g., in the form of a CQI message. The transmitter may use the CQI information to determine suitable transmission parameters and/or schemes, such as the number of transmit antennas to activate, the modulation and coding rates, and/or the bandwidth allocation.

One technique to increase reliability in a transmission system is to increase the number of outputs (e.g., transmit antennas) that transmit the same information. Thus, the same information may travel through multiple paths, allowing the receiver or receivers to more reliably estimate the transmitted information. This transmission technique is referred to as transmit diversity, and a system with multiple outputs (e.g., transmit antennas) and multiple inputs (e.g., receiver antennas) is commonly referred to as a multiple input multiple output (MIMO) system.

Conventional CQI methods estimate channel conditions using complete channel state information and are effective when the channel is relatively slowly fading in the time domain and less frequency selective in the frequency domain. However, transmit diversity schemes may present various challenges to estimating CQI using these conventional methods. For example, in some transmit diversity schemes, the channel state information may be limited or inaccurate, and portions of the communication channel may not be available or may be too complex to compute or manipulate. In some transmit diversity schemes, effective channels may experience fast fading in the time domain or large frequency selective fading in the frequency domain, rendering the conventional CQI methods ineffective.

SUMMARY OF THE INVENTION

In view of the foregoing, systems and methods are provided for determining a channel quality indicator (CQI) in a transmission system associated with an effective channel and a diversity transmission scheme.

In some embodiments, a plurality of independent diversity branches are identified in the diversity transmission scheme. Each one of the independent diversity branches corresponds to a different portion of the effective channel. An effective Signal-to-Noise Ratio (SNR) value is computed for each one of the identified independent diversity branches. The computed effective SNR values are combined for the identified independent diversity branches to generate a CQI value.

BRIEF DESCRIPTION OF THE FIGURES

The above and other aspects and potential advantages of the present disclosure will be apparent upon consideration of the following detailed description, taken in conjunction with the accompanying drawings, in which like reference characters refer to like parts throughout, and in which:

FIG. 2A is a vector model of a MIMO system that uses a first type of a transmit diversity scheme, known as Cyclic Delay Diversity (CDD) in accordance with embodiments of the present disclosure;

FIG. 2B is a vector model of a MIMO system that uses CDD with Spatial Multiplexing in accordance with embodiments of the present disclosure;

FIG. 3 is a vector model of a MIMO system that uses a second type of a transmit diversity scheme, known as Space-Time/Space-Frequency Block Code (STBC/SFBC) in accordance with embodiments of the present disclosure;

DETAILED DESCRIPTION OF THE INVENTION

The present disclosure generally relates to estimating a channel quality indicator (CQI) in a transmission system. In particular, systems and methods are described for estimating CQI for multiple input multiple output (MIMO) systems that employ transmit diversity schemes. In one aspect, the CQI is estimated using multiple independent diversity branches that correspond to different portions of the effective transmission channel.

Figure 1:
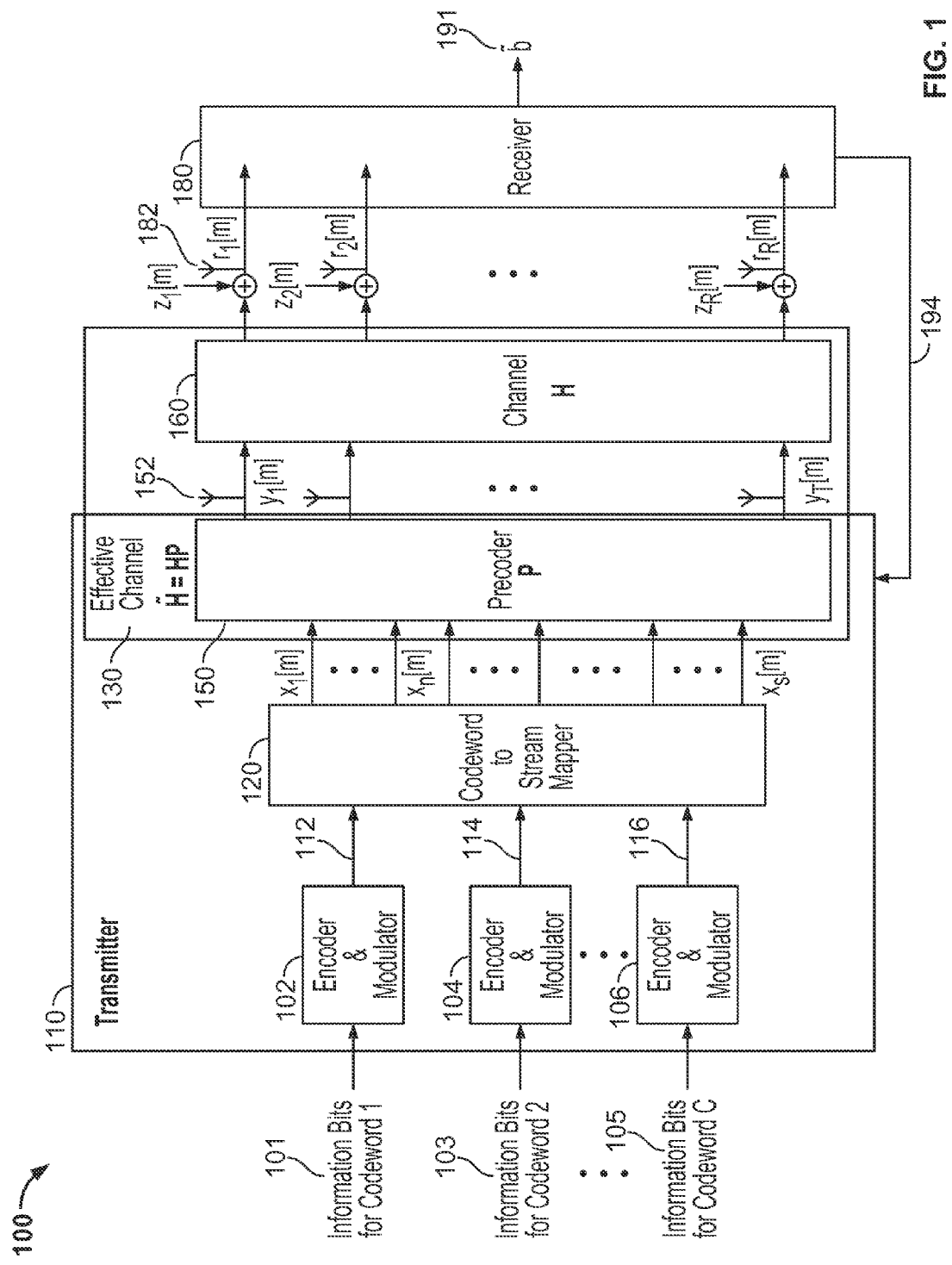
FIG. 1 is a high level block diagram of a data transmission system in accordance with embodiments of the present disclosure.

FIG. 1 shows an illustration of a data transmission system 100 in accordance with some embodiments. The system of FIG. 1 includes transmitter 110, channel 160, and receiver 180. In some embodiments, data to be transmitted may be divided between a large number of transmission systems such as system 100, where each system corresponds to one parallel transmission. For example, system 100 may correspond to one subcarrier that carries data in a particular frequency range, or a tone. In some embodiments, the illustrated system may represent a wireless communication system. In these embodiments, transmitter 110 may be a wireless router and receiver 180 may be a wireless receiver, such as a mobile telephone, computer, laptop, hand held device, or other such device. The components shown in transmitter 110 and receiver 180 may be implemented by a single integrated circuit (IC) or as separate components in a circuit board or implemented on a programmable logic device. These components may be implemented on separate devices or circuits and networked together.

Transmitter 110 may process C information bit sequences to produce C codewords using encoder and modulator blocks. For example, encoder and modulator blocks 102, 104, and 106 may process bit sequences 101, 103, and 105, to output codewords 112, 114, and 116, respectively. Although the present disclosure is described in terms of binary data, it is understood that bit sequences 101, 103, and 105 may be replaced with a sequence of non-binary digits or another type of information-containing symbol without departing from the scope of the present disclosure. In some embodiments, encoder and modulator blocks 102, 104, and 106 may include an encoder, e.g., that employs error correction or error detection codes to encode bit sequences 101, 103, and 105. For example, encoder and modulator blocks 102, 104, and 106 may encode bit sequences 101, 103, and 105 using CRC code, convolutional code, Turbo code, LDPC code, or any other suitable code. Encoder and modulator blocks 102, 104, and 106 may additionally include a modulator that modulates bit sequences 101, 103, and 105 or the encoded bit sequences of bit sequences 101, 103 and 105 based on any appropriate modulation scheme, such quadrature amplitude modulation (QAM), pulse amplitude modulation (PAM), or phase shift keying (PSK). Although encoder and modulator blocks 102, 104, and 106 are illustrated as separate blocks, they may be implemented as one or multiple encoder and modulator units.

Codeword to stream mapper 120 may process the C codewords output by the encoder and modulator blocks (e.g., encoder and modulator blocks 112, 114, and 116) to output S streams. These S streams are represented by coded values $x_1[m]$ through $x_S[m]$, where m is a transmission index associated with a transmission instance, which can be in time domain or frequency domain or any combination thereof. In some embodiments, m may refer to the index of symbols sent in the time domain. In some embodiments, m may represent the index of subcarriers (i.e., m=1 indexes a stream that is transmitted first, e.g., by a first subcarrier and m=2 indexes a stream that is transmitted second by a second, possibly different, subcarrier). Each codeword, e.g., codeword 112, may be mapped to n streams $x_1[m]$ through $x_n[m]$ ($1 \leq n \leq S$). The S streams $x_1[m]$ through $x_S[m]$ may be collectively referred to as a S×1 stream vector x(m) such that:

$$x(m)=[x_1[m],\ldots,x_S(m)]^T.$$

Although the rest of this disclosure will mainly discuss embodiments of transmission instances in the frequency domain (i.e., corresponding to subcarriers or tones), these embodiments are meant to be merely exemplary and not exhaustive or limiting. It should be understood that a transmission instance may be defined in time, frequency, and/or any combination thereof. For example, a transmission instance may correspond to a symbol sent in a specific time period.

Streams $x_1[m]$ through $x_S[m]$ may be input into MIMO precoder 150. MIMO precoder 150 may map stream $x_1[m]$ through $x_S[m]$ to transmit values $y_1[m]$ through $y_T[m]$, where T is the number of transmit antennas (T≥S). These transmit values may be grouped in a T×1 vector y(m), which will be referred to hereinafter as transmit vector y(m) where:

$$y(m)=[y_1[m],\ldots,y_T(m)]^T.$$

This mapping from stream vector x to transmit vector y may be performed using a linear precoding operation. For example, MIMO precoder 150 may generate transmit vector y by multiplying stream vector x by a T×S precoding matrix P, such that:

$$y(m)=P(m)x(m). \quad\quad (\text{EQ. 1})$$

Precoding matrix P may be chosen to implement certain transmission schemes. As will be discussed in greater detail below, precoding matrix P may be selected such that multiple copies of the same data stream $x_1[m]$ are sent across a number of transmit antennas to improve the reliability of data transfer. This redundancy results in a higher chance of being able to use one or more of the received copies to reconstruct the transmitted signals at the receiver.

Transmit values $y_1[m]$ through $y_T[m]$ may be transmitted using T transmit antennas through channel 160 and received by R receiver antennas at receiver 180. For example, $y_1[m]$ may be transmitted through transmit antenna 152. During transmission, $y_1[m]$ through $y_T[m]$ may be altered by a transmission medium, represented by channel 160, and additive noise sources $z_1[m]$ through $z_R[m]$. In a wireless communication system channel 160 may be the physical space between the transmit and receiver antennas, which obstructs and attenuates the transmitted signals due to at least time varying multipath fades and shadowing effects. Additive noise sources $z_1[m]$ through $z_R[m]$ may, for example, be ambient electromagnetic interference. In some scenarios, noise sources $z_1[m]$ through $z_R[m]$ may be modeled as additive white Gaussian noise (AWGN) with zero mean. Also, in many applications, channel 160 may be time invariant, meaning that the properties of the channel do not substantially change over an appropriate time scale. In real time data transmission systems, an appropriate time scale may be in the millisecond range.

Receiver 180 may receive signals $r_1[m]$ through $r_R[m]$ using R receiver antennas such as receiver antenna 182. These received signals will be collectively referred to as the $m^{th}$ received vector r(m), or simply the received vector r, where:

$$r(m)=[r_1[m], \ldots, r_R(m)]^T.$$

Receiver 180 may include any suitable number of receiver antennas, and therefore R may be any integer of at least one. Signals $r_1[m]$ through $r_R[m]$ may include information from one or more of signals $y_1[m]$ through $y_T[m]$ that have been attenuated and/or corrupted by channel 160 and noise sources $z_1[m]$ through $z_R[m]$. Receiver 180 may process the received signals to produce output bit sequence 191. The processing done by receiver 180 may include demodulation and decoding. Alternatively, output bit sequence 191 may be directed to a decoder (not shown) external to receiver 180.

Because of the multiple transmit antennas of transmitter 110 and the possibly multiple receiver antennas of receiver 180, channel 160 may sometimes be referred to as a MIMO channel with T inputs (from transmitter 110) and R outputs (to receiver 180), or simply a T×R MIMO channel. Due to channel properties, the signal received by each of the R receiver antennas may be based on signals from multiple transmit antennas. In particular, a signal received by each receiver antenna may be a linear combination of the signals provided by the transmit antennas. Thus, in matrix form, the $m^{th}$ received vector r(m) can be modeled by:

$$r(m)=H(m)y(m)+z(m), \qquad (EQ. 2)$$

where r is the R×1 received vector representing the signals received by the R receiver antennas of receiver 180 and H is a T×R matrix representing the effect of channel 160 on transmit vector y, and may sometimes be referred to as a channel response matrix. Vector y is a T×1 vector containing the transmit values transmitted by the T transmit antennas of transmitter 110, and z is an R×1 signal vector representing additive noise, where $z(m)=[z_1[m], \ldots, z_R(m)]^T$.

Substituting EQ. 1 into EQ. 2, one can compute an effective transmission channel relating the stream vector x to the received vector r as follows:

$$r(m)=H(m)P(m)x(m)+z(m)=\tilde{H}(m)x(m)+z(m),$$

were H(m) represents the actual channel characteristics used in channel 160 and $\tilde{H}(m)=H(m)P(m)$ represents the effective transmission channel as modified by precoder 150. In some embodiments, the precoding matrix P can be chosen such that an effective transmission channel $\tilde{H}(m)$ is created that maximizes the diversity gain of the system. For example, precoding matrix P may be chosen to change the apparent characteristics of the channel so that the effective channel matrix is more orthogonal than the actual channel matrix. Precoding matrix P may be a Givens rotation matrix, a Vandermonde matrix, a Fourier matrix, a Hadamard matrix or another type of matrix.

One purpose of providing multiple transmit antennas at transmitter 110 and receiver antennas at receiver 180 in a system 100 may be to create multiple paths through which data may be transmitted. This creates diversity in channel 160, which increases the likelihood that the data is received without the same corruption. In embodiments where there are multiple receiver antennas, receiver 180 may employ a diversity combining technique that uses all of the receiver antenna inputs to reconstruct the transmitted data. Diversity combining techniques combine the multiple received signals to obtain the single best estimate of the transmitted signal. A diversity combining technique may, for example, select the strongest signal from all the received signals.

In some embodiments, transmitter 110 may dynamically adjust the transmit vector y to achieve certain transmission conditions, e.g., in order to adjust channel throughput and/or bit error rate. In some embodiments, receiver 180 may transmit channel feedback information to transmitter 110 for use in generating transmit vector y. Pilot signals, i.e., signals that are known to the receiver, may be transmitted by the transmitter to the receiver. The receiver may process these pilot signals to generate channel feedback information corresponding to the current conditions of the transmission channel. This feedback computed by the receiver is referred to as Channel Quality Indicator (CQI). CQI values may be based on any suitable channel parameter such as Signal-to-Interference and Noise Ratio (SINR), Signal-to-Noise Ratio (SNR), Signal-to-Noise plus Distortion Ratio (SNDR), power of received signal, supportable data rates, supportable modulation and/or coding rates, and supportable throughput. The receiver 180 may transmit this feedback information (CQI) to the transmitter 110, e.g., via link 194. This CQI information may be used by transmitter 110, for example, to determine suitable transmission parameters and/or schemes, such as the number of transmit antennas to activate, the modulation and coding rates, and/or the bandwidth allocation.

One example diversity transmit scheme that may be applied by MIMO precoder 150 is known as Cyclic Delay Diversity (CDD). In CDD, each of the S streams $x_1[m]$ through $x_S[m]$ may be delayed by an antenna specific cyclic shift. For example, in the time domain, a cyclic delay of $k_i$ time samples may be added to the $i^{th}$ stream $x_i[m]$ before transmitting it from the $i^{th}$ transmit antenna. In the frequency domain, this corresponds to increasing the phase of $x_i[m]$ linearly with m, thereby increasing frequency selectivity of the effective channel.

Equations 201 and 211 of FIG. 2A model a system that uses CDD with one data stream (i.e., C=S=1), multiple transmit antennas (T>1), and one receiver antenna (R=1). In this case, T versions of the same stream $x_1[m]=x(m)$ may be transmitted from the T transmit antennas, wherein each version is delayed by a cyclical delay of $k_i$ time samples corresponding to the $i^{th}$ transmit value. As illustrated in the frequency domain representation of EQ. 201, the CDD scheme can be modeled as a T×R CDD precoding matrix P 208 or 209. This precoding matrix includes complex components (e.g., component 202 or 204) that each introduce a phase delay $$\frac{2\pi}{N_{FFT}} m k_i \text{ or } m\Theta_i,$$

where $N_{FFT}$ is the Fast Fourier Transform (FFT) length used to modulate x(m).

Equation 211 of FIG. 2A models the frequency domain relationship between the received vector r(m) and the stream vector x(m) in a system using CDD. In particular, by using the CDD precoding matrix P from EQ. 201, an effective channel 214 is obtained that is the sum of phase adjusted channel components $h_1(m), \ldots, h_T(m)$ corresponding to the respective T transmit antennas. It can be seen that this effective channel 214 is more frequency-selective than the individual channel components corresponding to the respective transmit antennas.

FIG. 2B is a vector model of a MIMO system that uses CDD with Spatial Multiplexing thereby extending the system of FIG. 2A to more than one stream (S>1). In this case, different streams may be multiplexed with stream-specific phases, such that different effective CDD channels, or paths are created. Each stream may be transmitted over an effective CDD path. For example, to achieve CDD with spatial multiplexing, precoding matrix P may be composed of three different matrices, a T×S precoding matrix W, a S×S cyclic delay matrix D, and a S×S per-stream phase matrix U, as illustrated in EQ. 251. In some embodiments, the precoding matrix W belongs to a set of precoding matrices $\{W_1, W_2, \ldots, W_L\}$. For example, a particular precoding matrix W for a transmission instance can be cyclically or randomly selected from the precoding matrices set. Cyclic delay matrix D introduces phase delays to each effective CDD path. Cyclic delay matrix D may be a diagonal matrix, e.g., matrix 254, such that each value on the diagonal corresponds to a complex exponential component whose phase increases linearly over subcarriers corresponding to the different effective CDD paths. Per-stream phase matrix U, such as matrix 256, is a unitary matrix that maps each stream i in each CDD effective path j to a stream phase delay $\phi_{ij}$.

Another example diversity scheme, referred to as Space-Time/Space-Frequency Block Code (STBC/SFBC), is illustrated in FIG. 3. In STBC/SFBC, a pair of orthogonal transmit vectors are transmitted using two neighboring transmission instances, e.g., for SFBC, subcarriers such as system 100 that have adjacent frequency resources. In the example of one stream to transmit (C=S=1) and two transmit antennas (T=2), EQ. 302 illustrates the frequency domain relationship between the transmit vector y and the stream vector x for two subcarriers indexed by 2m and 2m+1. In particular, a first subcarrier may transmit the first column 304 of EQ. 302, i.e., $y(2m)=[y_1(2m), y_2(2m)]^T$. Similarly, the second subcarrier may transmit $y(2m+1)=[y_1(2m+1), y_2(2m+1)]^T$. These two transmit vectors may be constructed from the same two streams x(2m) and x(2m+1) so that the two transmit vectors are orthogonal. In particular, the first subcarrier may transmit $$y(2m) = \frac{1}{\sqrt{2}} [x(2m),$$

$-x^*(2m+1)]^T$ (i.e., column 308 in EQ. 302), such that a first antenna of the first subcarrier transmits $$\frac{1}{\sqrt{2}} x(2m)$$

and a second antenna of the first subcarrier transmits $$-\frac{1}{\sqrt{2}} x^*(2m+1).$$

The second subcarrier may transmit $$y(2m+1) = \frac{1}{\sqrt{2}} [x(2m+1),$$

$-x^*(2m)]^T$ (i.e., column 310 in EQ. 310), such that a first antenna of the second subcarrier transmits $$\frac{1}{\sqrt{2}} x(2m+1)$$

and a second antenna of the second subcarrier transmits $$-\frac{1}{\sqrt{2}} x^*(2m).$$

The STBC/SFBC diversity scheme may be extended to more than 2 transmit antennas (i.e., T>2) by using antenna selection or hopping. For example, SFBC may be combined together with a particular scheme of antenna hopping or selection, frequency-switched transmit diversity (FSTD), as illustrated by EQ. 350 in FIG. 3. Although EQ. 350 of FIG. 3 is discussed in the context of the SFBC-FSTD scheme below, the same concepts may be applied in the time domain without departing from the scope of this disclosure. For example, in the STBC-FSTD scheme, the transmission instance may correspond to a symbol transmitted in a specific time period instead of a subcarrier as discussed in the context of EQ. 350 below.

Matrix 355 has four columns 354, 356, 358, and 360, corresponding to transmit vectors y(4m), y(4m+1), y(4m+2), and y(4m+3). Matrix 357 shows the content of each of the transmit vectors y(4m), y(4m+1), y(4m+2), and y(4m+3). For example, $$y(4m) = \frac{1}{\sqrt{2}} [x(4m),$$

$0, -x^*(2m+1)]^T$ (i.e., column 368 of matrix 357). The rows of matrix 357 may correspond to different transmit antennas and the columns of matrix 357 may correspond to different subcarriers. For example, rows 376, 378, 380, and 382 may correspond to the first, second, third, and fourth transmit antennas respectively. For the SFBC-FSTD transmission, four adjacent subcarriers may be grouped. On the first two subcarriers, that is, the subcarriers transmitting, respectively, y(4m) and y(4m+1) (corresponding to the first two columns 368 and 370 of matrix 357), one SFBC pair may be transmitted on the first and the third antennas, while the second and the fourth antennas may be inactive (hence the two zero entries in the second and fourth entries of column 368). On the third and the fourth subcarriers, another SFBC pair may be transmitted on the second and the fourth antennas, while the first and the third antennas may be inactive. In other words, FSTD maintains the simple 2×2 SFBC paradigm of FIG. 2A by hopping over or alternating between pairs of antennas for different subcarriers. By transmitting pairs of streams on different pairs of transmit antennas, SFBC-FSTD thus keeps the orthogonality property and achieves coded diversity across four transmit antennas.

As can be seen from FIGS. 2A, 2B, and 3 above, transmit diversity schemes introduce redundancy in order to improve reliability. Such redundancy may be exploited when computing Channel Quality Indicator (CQI) information, as will be discussed below in connection with FIGS. 4-9.

Figure 4:
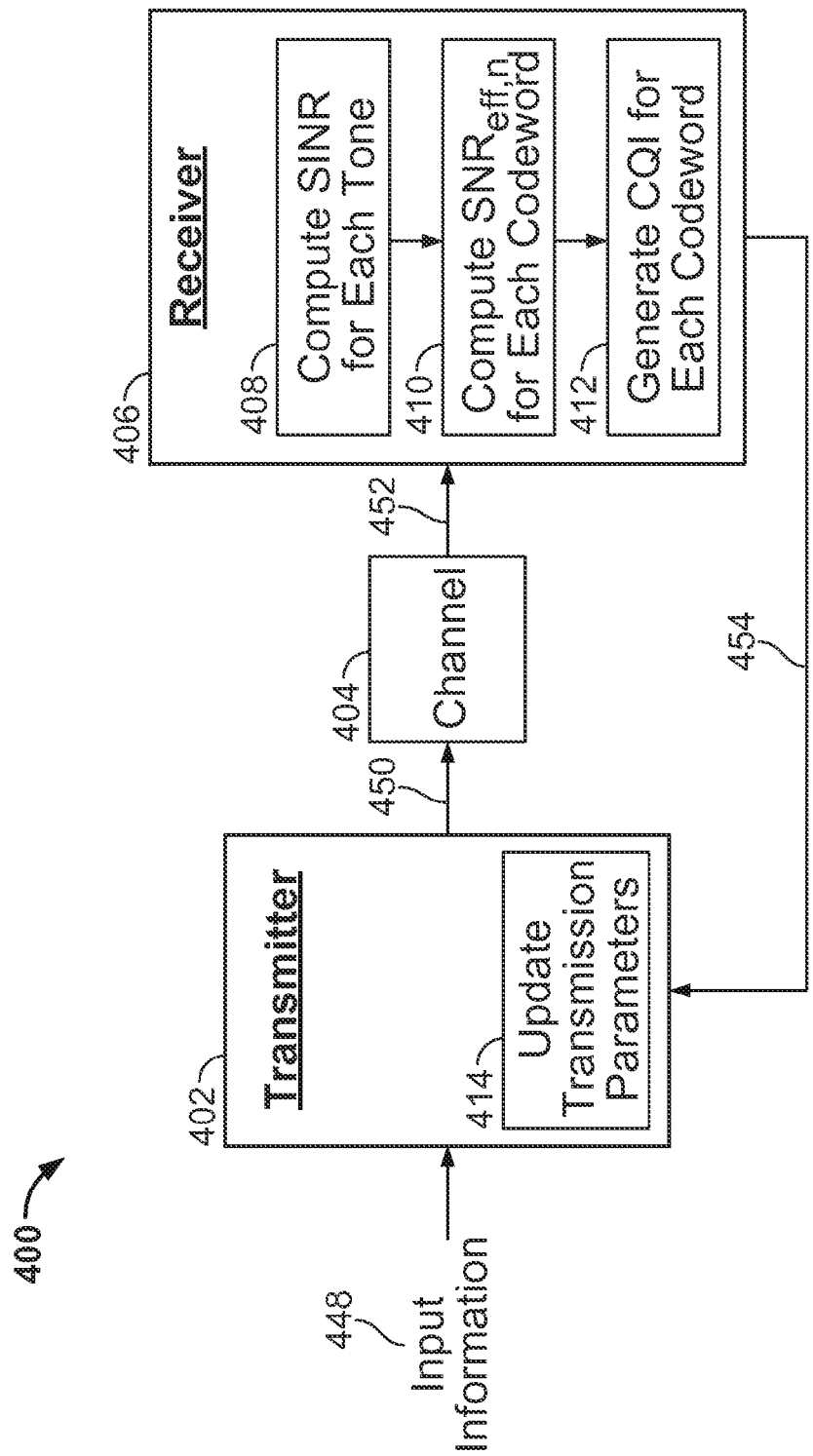
FIG. 4 is a simplified block diagram of a system that determines Channel Quality Indicator (CQI) in accordance with embodiments of the present disclosure.

FIG. 4 is a simplified block diagram of a system 400 that determines CQI. A transmitter 402 may communicate with receiver 406 through channel 404. In some embodiments, transmitter 402 may include one or more transmitters such as transmitter 110 of FIG. 1. Receiver 406 may include one or more receivers such as receiver 180 of FIG. 1. Channel 404 may be similar to channel 160 or effective channel 130 of FIG. 1. As illustrated in FIG. 4, transmitter 402 may send pilot input information 448 to receiver 406 through channel 404. Receiver 406 may estimate the channel information from the received pilot information 452. Receiver 406 may then generate channel feedback information 454, for example, by appropriately processing the received pilot information 452 in combination with a channel quality indicator table. The feedback information 454 may include a CQI index that defines transmission parameters such as modulation and coding scheme or coding spread.

In some embodiments, N transmission instances (e.g., N tones corresponding to N subcarriers) may be sampled to estimate CQI by receiver 406. The number of sampled transmission instances N may be less than the total available number of transmission instances in system 400. In some systems, this may be due to the complexity overhead of using the total number of transmission instances or to the unavailability of pilot signals for some transmission instances. In some systems, this may be due to the unavailability of the resource mapping in some future transmission instances—e.g., an unknown resource allocation in some future transmissions. At 408, processing circuitry of receiver 406 may first compute a Signal-to-Interference and Noise Ratio $SINR_{is}$ value for each tone i of the N sampled tones (i=1, . . . , N) in response to receiving an $s^{th}$ stream $x_s$ associated with input information 448. For example, the $SINR_{is}$ may be calculated as the quotient between the average received modulated subcarrier power and the average received co-channel interference power, i.e. cross-talk, from other transmitters than the useful signal. In some implementations, the SINR values may be computed using signal power and noise power estimation selection circuitry and SINR estimate computation circuitry. These components may be implemented in the processing circuitry of receiver 406 by a single integrated circuit (IC) or as separate components in a circuit board or implemented on a programmable logic device. In these implementations, the $SINR_{is}$ may be by estimated by computing an estimated average of the desired signal power (signal power) and an estimated variance of the noise plus interference power (noise power). The SINR corresponds to the ratio of the signal power to the noise power.

At 410, an effective Signal-to-Noise Ratio (SNR) for an $n^{th}$ codeword is obtained that measures how much a particular codeword corresponding to input information 448 has been corrupted by noise. The effective SNR may be obtained by mapping the $SINR_{is}$ values for all streams corresponding to the $n^{th}$ codeword and over all sampled N tones. For example, the $SNR_{eff,n}$ may be computed as:

$$SNR_{eff,n} = f(SINR_{1s}, SINR_{2s}, \ldots, SINR_{Ns}; s \in S_n), \quad (EQ. 3)$$

where $S_n$ is the set of indices of all streams corresponding to the $n^{th}$ codeword, and f( ) is a mapping function from the sequence of $SINR_{is}$ to an effective SNR for that codeword. In one example, function f( ) may correspond to the finite alphabet capacity (FAC) scheme where modulated FAC values of each $SINR_{is}$ are averaged over all tones and all streams corresponding to the $n^{th}$ codeword as follows:

$$SNR_{eff,n}^{(FAC)} = \frac{1}{N|S_n|} \sum_{s \in S_n} \sum_{i=1}^{N} FAC(SINR_{is}).$$

In some embodiments, different functions f( ) corresponding to different CQI schemes may be employed. Examples of such schemes may include, in addition to FAC, MMIB (mean mutual information per bit) and EESM (exponential effective SNR mapping).

At 412, the effective SNR for the $n^{th}$ codeword ($SNR_{eff,n}$) that is computed at 410 may be mapped to a CQI for that codeword using a CQI mapping function CQI( ) (i.e., $CQI_n = CQI(SNR_{eff,n})$). This CQI ( ) function may be determined from the CQI scheme employed. In some embodiments, the CQI ( ) function may correspond to a table look up from a CQI table that matches the computed channel condition, e.g. SINR or SNR values. For example, for a given range of $SNR_{eff,n}$, a CQI index is selected from the CQI table. In some embodiments, the CQI table may include, in addition to ranges of effective SNR values, modulation and coding schemes best suited for transmission over the existing channel 404. In some embodiments, receiver 406 may use, in addition to the SINR and the SNR values, other types of information such as type of receiver, channel statistics, and/or resource allocation, to select transmission parameters that maximize performance such as spectral efficiency and throughput, or to minimize error rate. Using a table look up (e.g., comparing to a CQI table using processing circuitry at receiver 406), an appropriate CQI index may be generated. Feedback information 454 comprising the CQI index may be generated and sent to transmitter 402.

In systems where the effective channel is perfectly known (such as single input single output or single input multiple output systems), SINR is easy to obtain based on the channel gain and the known precoder P. However, transmit diversity schemes such as CDD of FIGS. 2A and 2B or STBC/SFBC of FIG. 3 may present challenges to deriving or using prefect channel state information to estimate CQI. For example, in a CDD scheme, portions of the effective channel (e.g., some frequency or time channel matrices) may not be available or may not be used for transmission. In some embodiments, precoder W in a CDD scheme may vary fast in a small frequency or time range (e.g., for every tone in CDD), which may make it hard, if not impossible, to compute SINR values for the entire effective channel. In some embodiments, the effective channel itself may be hard to derive or manipulate, e.g., in STBC/SFBC-FSTD schemes.

Figure 5:
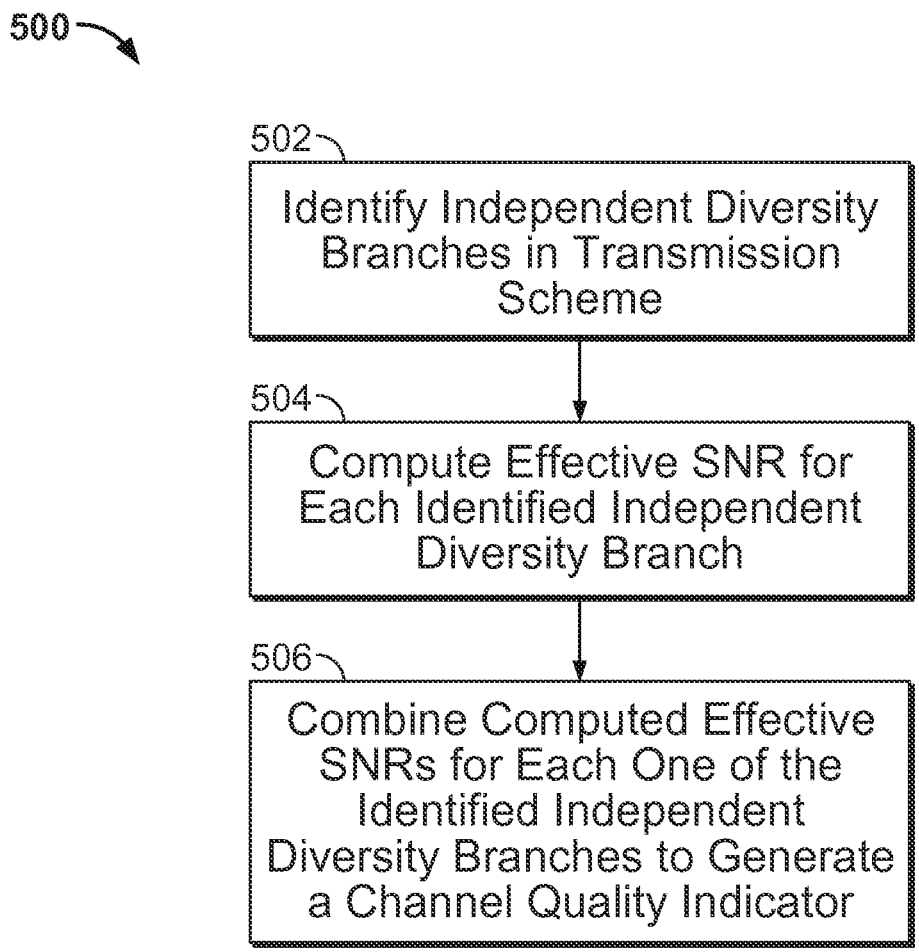
FIG. 5 is a flow diagram illustrating a process for determining CQI in accordance with embodiments of the present disclosure.

FIG. 5 is a flow diagram illustrating a process 500 for determining CQI in accordance with embodiments of the present disclosure. Process 500 includes 502, 504, and 506, and may be implemented in processing circuitry of receiver 180 of FIG. 1 or of FIG. 4.

At 502, independent diversity branches are identified in the transmit diversity scheme. These independent diversity branches may be chosen such that each independent diversity branch represents a possible path for data to propagate from the transmitter to the receiver. For example, the diversity branches may be chosen to exhaustively enumerate the diversities existing in the communication channel, i.e., all suitable combinations of frequency, time, spatial, and/or codeword diversity. Hence, for each diversity branch, only a portion of the transmitted data or a portion of the effective channel H may be used to compute channel quality information. In this way, the diversity branches may be chosen to exploit the diversity of the communication channel.

In some embodiments, each codeword or stream may correspond to an independent diversity branch. An SINR may be computed for each codeword (or stream). The SINR values computed for each one of the codewords may be combined to choose a single CQI for all codewords.

In some embodiments, e.g., in a system employing CDD, each combination of a precoder W, a cyclic delay matrix D, and a per-stream phase matrix U may correspond to an independent diversity branch. For CDD schemes with large delays that are sparsely sampled, each combination of precoder W and per-stream phase matrix U may correspond to an independent diversity branch. In this case, it may be possible to omit the cyclic delay matrix D from the independent diversity branch because the phase varies fast within the frequency range of a channel sample.

In some embodiments, each pair of transmit antennas used in a STBC/SFBC scheme to transmit orthogonal vectors may correspond to an independent diversity branch. In some embodiments, each pair of transmit antennas that are hopped over in a STBC/SFBC-FSTD scheme to transmit orthogonal vectors may correspond to an independent diversity branch.

These independent diversity branches are meant to be exemplary, and it should be understood that at 502, any suitable data path from transmitter to receiver, e.g., from transmitter 110 to receiver 180 of FIG. 4, and/or any suitable portion of the effective channel, e.g., of effective channel 150 of FIG. 1, may be selected as an independent diversity branch in a diversity scheme. In general, an independent diversity branch may include any combination of frequency, time, time and frequency, and spatial components of an effective channel or of any wired or wireless paths or combinations of the same. By appropriately choosing independent diversity branches associated with active transmission paths in the effective channel, process 500 can take advantage of the redundancy introduced by transmit diversity schemes to simplify the CQI computation. For example, channel conditions may only be computed for independent active components in each transmission instance.

At 504, an effective SNR is computed for each one of the independent diversity branches identified at 502. In some embodiments, this may involve first computing a sequence of SINR values for each independent diversity branch. This sequence of SINR values may be translated into an effective SNR value for each independent diversity branch. Any one of a number of schemes may be used for determining an effective SNR value from the SINR sequence for each independent diversity branch, such as FAC, MMIB, or EESM, as discussed above.

At 506, the effective SNR values computed at 504 are combined to generate a CQI. In some embodiments, the effective SNR values may be averaged over all independent diversity branches to produce a global effective SNR. A CQI selection algorithm, such as the one discussed in connection with FIG. 4 above, may be used to map from the global effective SNR to a CQI. For example, a CQI table mapping global effective SNR values to different CQI index values and modulation and transmission schemes may be used to look up the CQI value. In some embodiments, the same generated CQI may be selected for all codewords, rather than computing a codeword CQI for each transmitted codeword, as discussed above. This is possible because of the redundancy of transmit diversity schemes.

Figure 6:
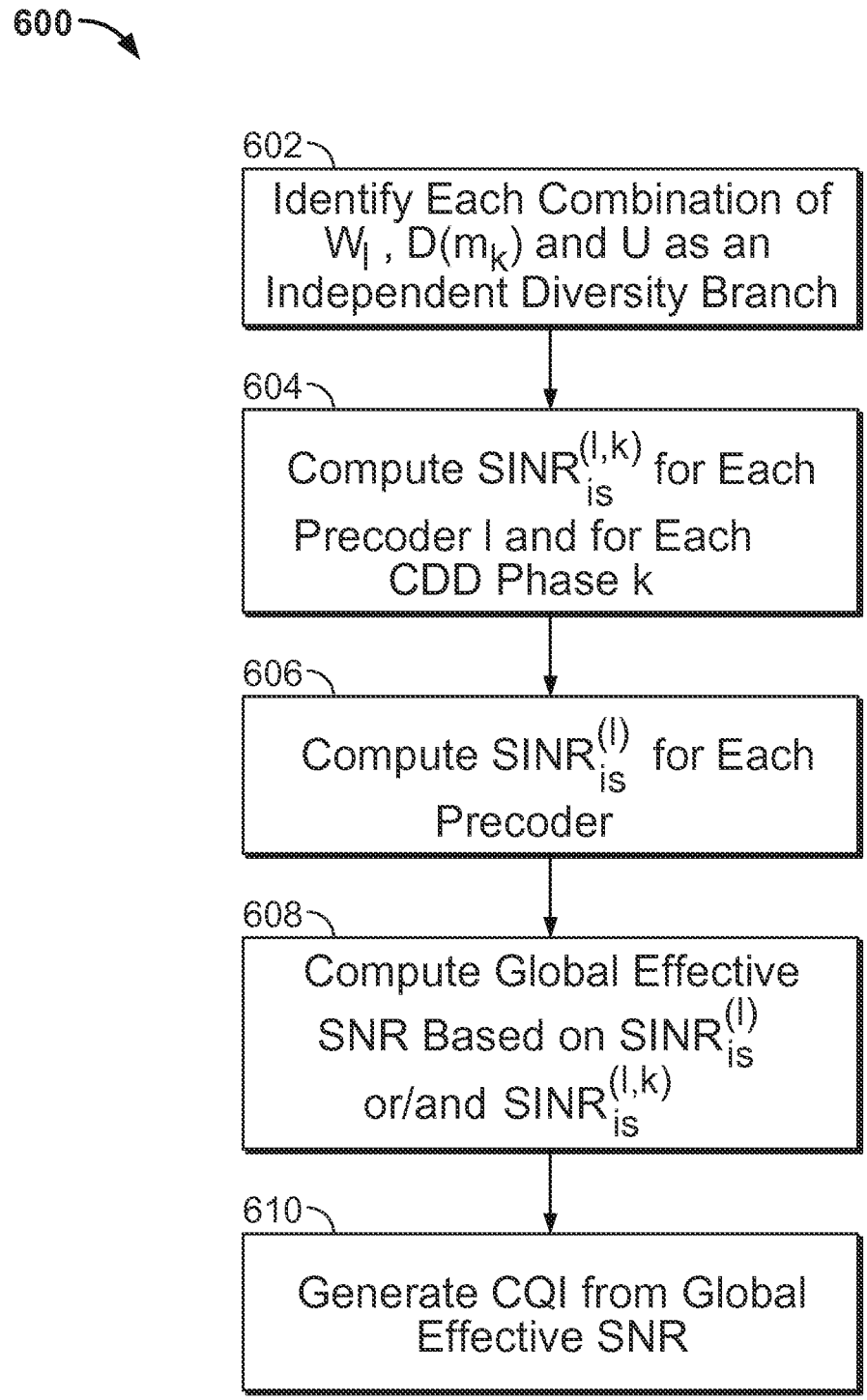
FIG. 6 is a flow diagram illustrating a process for determining CQI in a system that employs CDD in accordance with embodiments of the present disclosure.
Figure 7:
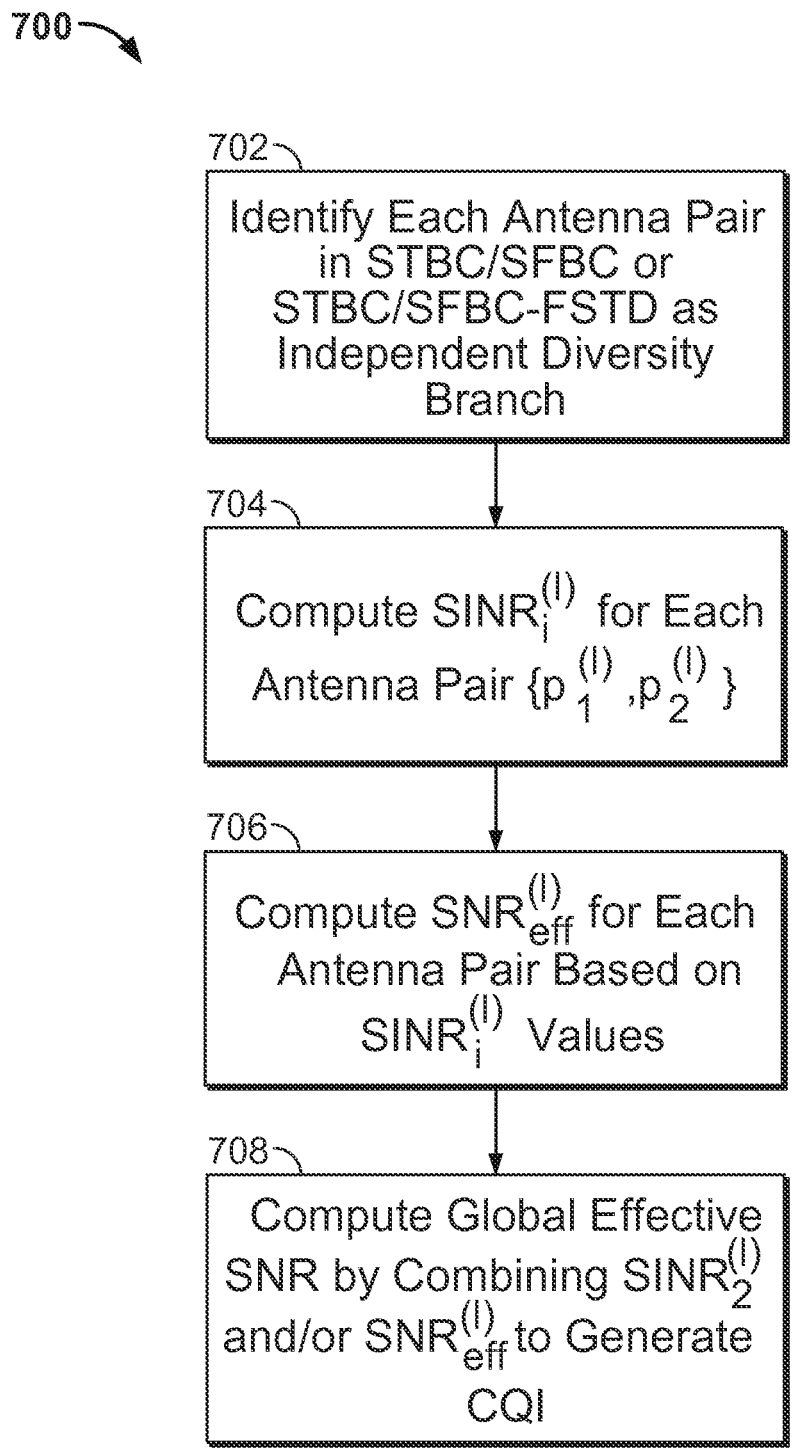
FIG. 7 is a flow diagram illustrating a process for determining CQI in a system that employs SFBC in accordance with embodiments of the present disclosure.

Two embodiments of process 500 are illustrated in FIGS. 6 and 7 below. FIG. 6 is a flow diagram illustrating process 600 for determining CQI in a system that employs CDD with spatial multiplexing in accordance with embodiments of the present disclosure. Process 600 of FIG. 6 includes 602, 604, 606, 608, and 610.

At 602, independent diversity branches are identified for each channel sample $H_i$ (i=1, ..., N), where N is the number of transmission instances (e.g. subcarriers or tones) used to compute CQI. Each one of the N channel samples $H_i$ (where $H_i = H(m_i)$, and i=1, ..., N) may represent a range i of channels in frequency/time domain. Each channel sample $H_i$ may correspond to K CDD phases, such that the $m_k^{th}$ subcarrier (k=1, ..., K) is in the phase range that $H_i$ represents. S refers to the number of streams that may be transmitted and L is the number of precoding matrices $W_l$ (l=1, ..., L) that may be used for each subcarrier in $H_i$. These L precoding matrices may be the same or different. Each combination of precoding matrix $W_l$ (l=1, ..., L), CDD phase k (k=1, ..., K), and stream s (s=1, ..., S), i.e., each particular combination (l,k,s), may correspond to an independent diversity branch. That means that a total of SLK independent diversity branches may be identified for each channel sample $H_i$.

At 604, an SINR is computed for each one of the independent diversity branches identified at 602. In some embodiments, an $SINR_{is}^{(l,k)}$ may be computed for each precoding matrix $W_l$ and CDD phase k, according to the following equation:

$$SINR_{is}^{(l,k)} = SINR_{is}(H_i W_l D(m_k) U).$$

Thus, an SINR is computed for every independent diversity branch (i.e., for every combination of components $W_l D(m_k) U$) and for every channel sample $H_i$.

At 606, an $i^{th}$ tone receiver-output SINR for the $s^{th}$ stream (i.e., $SINR_{is}^{(l)}$) may be computed for each precoding matrix W. In some embodiments, this $SINR_{is}^{(l)}$ may be estimated by averaging the product of $W_l$, $D(m_k)$, and U over all K CDD phases, as shown below:

$$SINR_{is}^{(l)} = SINR\left( H_i \frac{1}{K} \sum_{k=1}^{K} (W_l D(m_k) U) \right). \quad (EQ.\ 4)$$

In some embodiments, for example, with large delay CDD and sparsely sampled channels in frequency domain, the averaging of EQ. 4 may have a similar effect as omitting the cyclic delay matrix component $D(m_k)$ from the independent diversity branch. In this case, each channel sample $H_i$ may represent a wide range of channels for which all possible phases caused by the large delay have been applied, possibly for many times. Accordingly, the effective CDD channel's response may have particularly high frequency selectivity within this wide range represented by $H_i$, fluctuating around the non-CDD channel response. Since only one channel sample $H_i$ is used to represent this wide range of channels, the average effect of this frequency or phase diversity may be averaged out. In other words, the cyclic delay matrix D may be omitted from the independent diversity branch. In this way, the $SINR_{is}^{(l)}$ may be simplified to:

$$SNR_{is}^{(l)} = SINR(H_i W_l U). \quad (EQ.\ 5)$$

As can be seen from EQ. 5, the combination of $W_l U$ may be viewed as the independent diversity branch.

At 608, the SINR values computed at 604 and/or 606 may be combined to compute a global effective SNR. In some embodiments, and starting from the per-precoder and per-delay-phase $SINRI_{is}^{(l,k)}$ value computed at 604, an effective SNR may first be computed for each independent diversity branch (i.e., for each (s,l,k)) by mapping the plurality of $SNRI_{is}^{(l,k)}$ values for all N tones as follows:

$$SNR_{eff,s}^{(l,k)} = f(SINR_{1s}^{(l,k)}, \ldots, SINR_{Ns}^{(l,k)}).$$

The $SNR_{eff,s}^{(l,k)}$ values may then be averaged over the total number SLK of independent diversity branches to compute the global effective SNR as follows:

$$SNR_{eff} = \frac{1}{SLK} \sum_{s=1}^{S} \sum_{l=1}^{L} \sum_{k=1}^{K} SNR_{eff,s}^{(l,k)}.$$

In some embodiments, and starting from the per-precoder SINR value (i.e., $SINR_{is}^{(l)}$) computed at 608, a global effective SNR may be computed by mapping the per-precoder SINR value using a mapping function. For example, the $SINR_{is}^{(l)}$ values may be translated into a global effective SNR using a FAC function and averaging over all S streams, all L precoders L, and all N tones, as follows:

$$SNR_{eff}^{(FAC)} = \frac{1}{SL} \sum_{s=1}^{S} \sum_{l=1}^{L} \left( \frac{1}{N} \sum_{i=1}^{N} FAC(SINR_{is}^{(l)}) \right).$$

At 610, a CQI is generated based on the computed global effective SNR. For example, a CQI table may be used that maps different SNR values to a CQI index as discussed above. In some embodiments, other properties, such as transmission modes and receiver type may also be used to determine the CQI index.

FIG. 7 is a flow diagram illustrating process 700 for determining CQI in a system that employs SFBC or SFBC-FSTD in accordance with some embodiments. Process 700 includes 702, 704, 706, and 708.

At 702, independent diversity branches are identified for each channel sample $H_i$ (i=1, ..., N), where N is the number of tones or subcarriers used to compute CQI. An independent diversity branch may correspond to a pair of transmit antennas that are used for transmitting orthogonal vectors. Each channel sample $H_i$ may have p columns (p=1, ..., T). Due to antenna hopping, each sample channel $H_i$ may be used for transmitting one of L pairs of orthogonal vectors. Because each pair of antenna pairs used for orthogonal transmission may correspond to an independent diversity branch, a total of L independent diversity branches may be identified for each channel sample $H_i$. In a SFBC scheme with T=2 and L=1 (i.e., as illustrated in FIG. 2A), an independent diversity branch may correspond to the first and second transmit antennas. In a SFBC-FSTD scheme with T=4 and L=2 (i.e., as illustrated in FIG. 2A), a first independent diversity branch may correspond to the first and third transmit antenna, and a second independent diversity branch may correspond to the second and fourth transmit antennas.

At 704, an SINR is computed for each one of the independent diversity branches identified at 702. In some embodiments, an $i^{th}$ tone receiver-output SINR ($SINR_i^{(l)}$), i=1, ..., N, and l=1, ..., L) may be computed for each independent diversity branch by summing channel gains over the independent diversity branches according to the following equation:

$$SINR_i^{(l)} = \frac{1}{2\sigma^2} \sum_{p \in \{p_1^{(l)}, p_2^{(l)}\}} \|H_i^{(p)}\|^2, \quad \text{(EQ. 6)}$$

where $H_i^{(p)}$ is the $p^{th}$ column of $H_i$ and $$\{p_1^{(l)}, p_2^{(l)}\}$$

denotes the independent diversity branch corresponding to subcarrier 1. For example, in the SFBC case discussed above of T=2 and L=1, $$\{p_1^{(l)}, p_2^{(l)}\}$$

may correspond to transmit antennas {1,2}. In the STBC/SFBC-FSTD example discussed above of T=4 and L=2, $$\{p_1^{(l)}, p_2^{(l)}\}$$

may correspond to the first and third transmit antenna {1,3} or the second and fourth transmit antenna {2,4}. As explained in FIG. 2B above, these pairs of antennas correspond to the activated pairs of transmit antennas in the FSTD scheme for subcarrier 1.

At 706, an effective $SNR_{eff}^{(l)}$ may be computed for each independent diversity branch by mapping the $SINR_i^{(l)}$ values computed in EQ. 6 for all tones i=1, ..., N, as follows:

$$SNR_{eff}^{(l)} = f(SINR_1^{(l)}, \ldots, SINR_N^{(l)}).$$

At 708, the effective SNR values computed at 706 for each independent diversity branch may be combined to compute a global effective SNR. For example, a global effective SNR may be computed by averaging the $SINR_{eff}^{(l)}$ over all L independent diversity branches as follows:

$$SNR_{eff} = \frac{1}{L} \sum_{l=1}^{L} SNR_{eff}^{(l)}.$$

In some embodiments, the $SINR_i^{(l)}$ computed at 704 may be used to compute the global effective SNR using the FAC scheme, i.e., $$SNR_{eff,n}^{(FAC)} = \frac{1}{L} \sum_{l=1}^{L} \left( \frac{1}{N} \sum_{i=1}^{N} FAC(SINR_i^{(l)}) \right).$$

At 710, a CQI is generated based on the computed global effective SNR. As explained above, CQI information may be transmitted in the form of a CQI message from the receiver (e.g., receiver 110 of FIG. 1) to the transmitter (e.g., transmitter 180 of FIG. 1). The receiver may generate the CQI messages by accessing a standardized CQI table where the table contains ranges of uniquely indexed CQI values. The range in which the measured channel quality (such as the global effective SNR) falls is identified by selecting the corresponding index value. In some embodiments, the receiver may select a CQI index from a single CQI table that maximizes the spectral efficiency and throughput of the receiver and feeds the selected index back to the transmitter.

Although process 700 above was discussed in the context of transmission instances in the frequency domain, this is merely exemplary and not intended to be exhaustive or limiting. It should be understood that process 700 may be extended to the time domain (e.g., for STBC or STBC-FSTD) without departing from the scope of this disclosure. This can be done, for example, by selecting independent diversity branches to correspond to the appropriate time domain transmission instances (e.g., a symbol received in a specific time period).

Figure 8:
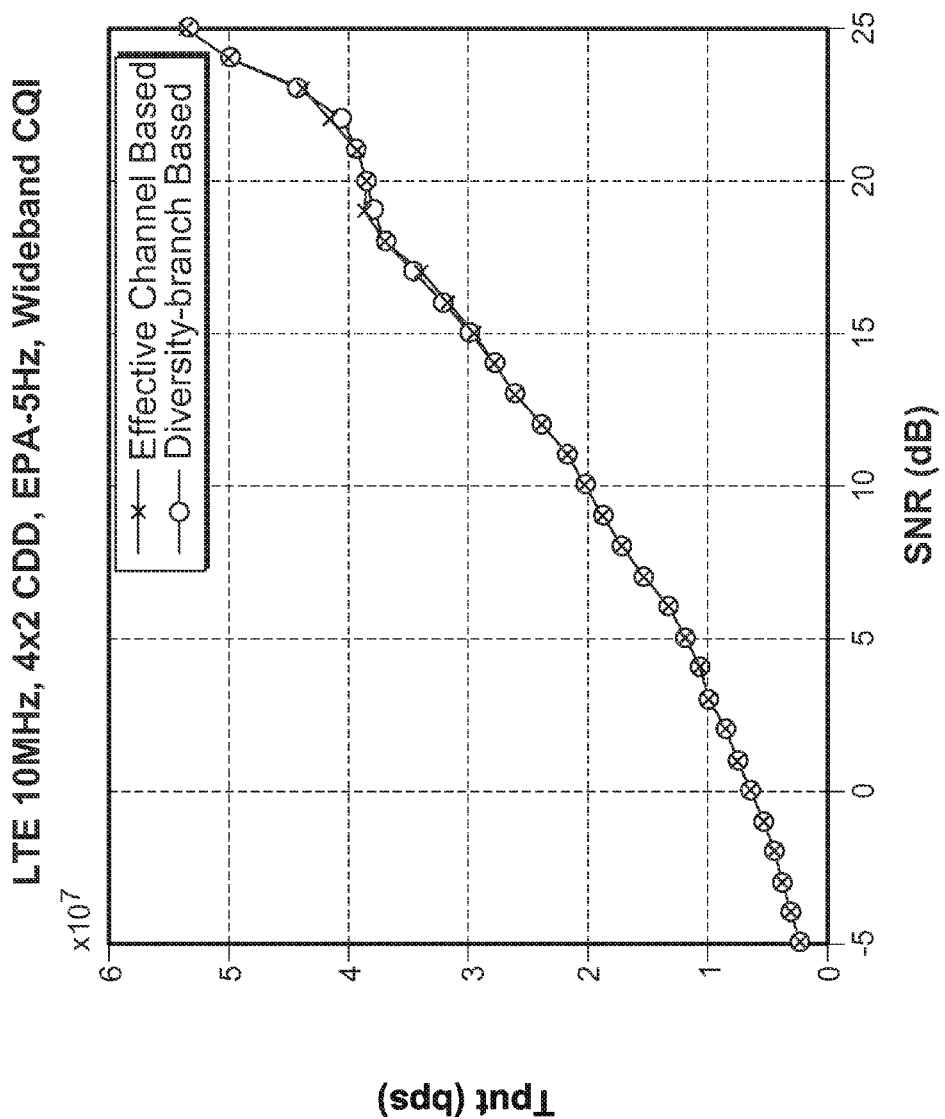
FIG. 8 shows a simulated performance of a process for determining CQI in a MIMO system using CDD, in accordance with some embodiments of the present disclosure.
Figure 9:
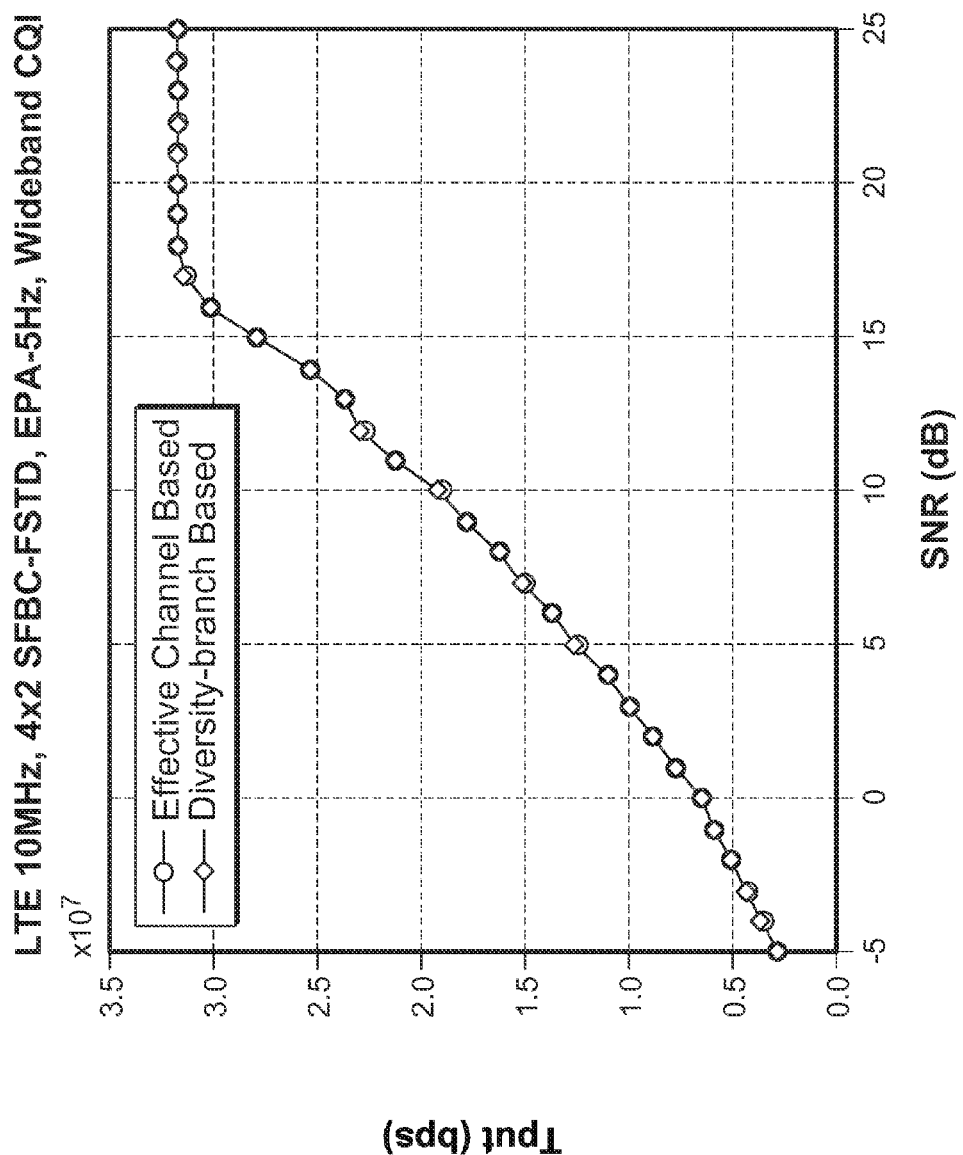
FIG. 9 shows a simulated performance of a process for determining CQI in a MIMO system using SFBC-FSTD, in accordance with some embodiments of the present disclosure.

By limiting the SINR and SNR computations to the appropriately selected independent diversity branches in a transmit diversity scheme, the redundancy of the transmit diversity scheme may be exploited to reduce complexity. FIGS. 8 and 9 illustrate the performance of the diversity branch based CQI approach of FIGS. 5, 6, and 7 above compared to a conventional CQI estimation method.

FIG. 8 shows a simulated performance of process 600 of FIG. 6 for determining CQI in a MIMO system using CDD, in accordance with some embodiments. The simulated system uses a Long Term Evolution (LTE) MIMO implementation with carrier bandwidth of 10 MHZ. Transmission is simulated using the Extended Pedestrian A (EPA)-5 HZ propagation channel model. The transmit diversity used is 4×2 CDD with low spatial correlation. The simulated system uses wideband CQI, which corresponds to the average CQI experienced by the receiver across the entire bandwidth.

The x axis represents Signal-to-Noise ratio (SNR) (in decibels (db)) and the y axis represents throughput (in bits per seconds (bps)). The first graph, marked with 'x', represents the ideal performance, and uses the exact precoding matrix P for each tone as data is being transmitted. This exact precoding is computed for all OFDM symbols used in the duration of the performance measurement for each received tone of the total transmitted $N_{total}$ tones. For example, the number of OFDM symbols used in the duration of the measurement in the system illustrated in FIG. 8 is 14 (i.e., $N_{OFDM\_symbols}$=14). Accordingly, a total number of $N_{OFDM\_symbols} \cdot N_{total}$ SNR computations are made (i.e., for each transmitted tone and each OFDM symbol). This approach is referred to as the effective channel based CQI approach, since the effective channel is used for each transmitted tone and for each OFDM symbol to compute the CQI.

The second graph, marked with 'o', corresponds to the diversity branch based CQI approach (e.g., process 600 of FIG. 6). In this scheme, SINR values are computed for a plurality of independent diversity branches each comprising a combination of a precoding matrix $W_j$, cyclic delay matrix $D(m_k)$ corresponding to subcarrier $m_k$, and per-stream matrix U for $N=\frac{1}{6} N_{total}$. The diversity branch based CQI approach illustrated in FIG. 8 is based on one OFDM symbol, while the effective channel based CQI approach is based on all 14 OFDM symbols. While the effective channel based CQI approach computes SNR values for all $N_{OFDM\_symbols}$ OFDM symbols for each one of the $N_{total}$ transmitted tones, the diversity branch based CQI approach uses only ⅙ of the total transmitted $N_{total}$ tones for a total of one OFDM symbol. This means that the illustrated diversity branch based CQI approach uses only $1/(6 \cdot N_{OFDM\_symbols})$ of the total number of SNR computations made in the effective channel based approach. A comparison of both graphs therefore shows that performance of the diversity branch based CQI approach is almost the same as the effective channel based CQI approach (i.e., ideal performance) but with significantly less complexity.

FIG. 9 shows a simulated performance of process 700 of FIG. 7 for determining CQI in a MIMO system using SFBC-FSTD, in accordance with some embodiments. The simulation parameters are similar to the ones discussed in FIG. 8 above, except that the transmit diversity scheme used is 4×2 SFBC-FSTD.

The first graph, marked with 'x', represents the ideal performance, and uses the exact precoding matrix P for each transmitted tone, i.e., the effective channel based CQI approach. The second graph, marked with 'o', corresponds to the diversity branch based CQI approach (e.g., process 700 of FIG. 7), where SINR values are computed for only pairs of transmitting antennas for each one of N sampled tones, where $N=\frac{1}{6} N_{total}$. In this simulation, the diversity branch based CQI approach uses only $1/(6 \cdot N_{OFDM\_symbols})$ of the total number of SNR computations made in the effective channel based approach. Similarly to FIG. 8 above, a comparison of both graphs shows that performance of the diversity branch based CQI approach is almost the same as the effective channel based CQI approach (i.e., ideal performance) but with significantly less complexity.

It should be understood that the above steps of the flowcharts of FIGS. 5-7 may be executed or performed in any order or sequence not limited to the order and sequence shown and described in the figure. Also, some of the above steps of processes 500, 600, and/or 700 may be executed or performed substantially simultaneously where appropriate or in parallel to reduce latency and processing times. Any of the steps in these processes may be omitted, modified, combined, and/or rearranged, and any additional steps may be performed, without departing from the scope of the present disclosure.

The foregoing describes systems and methods for reliable and efficient information transmission. Those skilled in the art will appreciate that the disclosed methods and systems can be practiced by other than the described embodiments, which are presented for the purpose of illustration rather than of limitation. Modifications and variations are possible in light of the above teachings or may be acquired from practice of the disclosed methods and systems. While certain components of this disclosure have been described as implemented in hardware and others in software, other configurations may be possible.

What is claimed is:

1. A method for determining a channel quality indicator (CQI), the method comprising:
   identifying a plurality of combinations of (i) a precoding matrix selected from a plurality of precoding matrices, (ii) a cyclic delay phase selected from a plurality of delay phases, and (iii) a transmitted stream selected from a plurality of transmitted streams;
   computing, using receiver circuitry, an effective Signal-to-Noise Ratio (SNR) value for each one of the identified combinations; and
   averaging the computed effective SNR values over the identified combinations to determine a CQI value.

2. The method for determining the CQI of claim 1, further comprising:
   computing a global effective SNR based on said averaging the computed effective SNR values over the identified combinations; and
   mapping the computed global effective SNR to the CQI value.

3. The method for determining the CQI of claim 1, further comprising averaging, over the plurality of delay phases, a product of (i) the selected precoding matrix, (ii) a cyclic delay matrix, and (iii) a per-stream phase matrix.

4. The method for determining the CQI of claim 1, further comprising computing a plurality of Signal-to-Interference and Noise Ratio (SINR) values, wherein each one of the SINR values corresponds to one of the identified combinations.

5. The method for determining the CQI of claim 4, wherein computing the each one of the SINR values for the corresponding one of the identified combinations comprises computing a product of (i) the selected precoding matrix for the corresponding one of the identified combinations, (ii) a cyclic delay matrix, and (iii) a per-stream phase matrix.

6. The method for determining the CQI of claim 4, wherein computing the each one of the SINR values for the corresponding one of the identified combinations comprises computing an SINR value for each tone received at the receiver circuitry and for the corresponding one of the identified combinations.

7. The method for determining the CQI of claim 4, wherein computing the each one of the SINR values comprises:
for each tone received at the receiver circuitry, computing a corresponding SINR value for each transmitted stream and each precoding matrix.

8. A system for determining a channel quality indicator (CQI), the system comprising processing circuitry configured for:
identifying a plurality of combinations of (i) a precoding matrix selected from a plurality of precoding matrices, (ii) a cyclic delay phase selected from a plurality of delay phases, and (iii) a transmitted stream selected from a plurality of transmitted streams;
computing an effective Signal-to-Noise Ratio (SNR) value for each one of the identified combinations; and
averaging the computed effective SNR values over the identified combinations to determine a CQI value.

9. The system for determining the CQI of claim 8, wherein the processing circuitry is configured for:
computing a global effective SNR based on said averaging the computed effective SNR values over the identified combinations; and
mapping the computed global effective SNR to the CQI value.

10. The system for determining the CQI of claim 8, wherein the processing circuitry is configured for averaging, over the plurality of delay phases, a product of (i) the selected precoding matrix, (ii) a cyclic delay matrix, and (iii) a per-stream phase matrix.

11. The system for determining the CQI of claim 8, wherein the processing circuitry is configured for computing a plurality of Signal-to-Interference and Noise Ratio (SINR) values, wherein each one of the SINR values corresponds to one of the identified combinations.

12. The system for determining the CQI of claim 11, wherein the processing circuitry is configured for computing a product of (i) the selected precoding matrix for the corresponding one of the identified combinations, (ii) a cyclic delay matrix, and (iii) a per-stream phase matrix.

13. The system for determining the CQI of claim 11, wherein the processing circuitry is configured for computing an SINR value for each tone received at receiver circuitry and for the corresponding one of the identified combinations.

14. The system for determining the CQI of claim 11, wherein the processing circuitry is configured for computing, for each tone received at receiver circuitry, a corresponding SINR value for each transmitted stream and each precoding matrix.

15. A method for determining a channel quality indicator (CQI), the method comprising:
identifying one or more pairs of transmit antennas in a transmission system, wherein each pair of the one or more pairs of transmit antennas is configured to transmit respective orthogonal vectors;
for each transmission instance received at receiver circuitry, computing one or more Signal-to-Interference and Noise Ratio (SINR) values associated with a respective one of the one or more pairs of transmit antennas;
computing an effective Signal-to-Noise Ratio (SNR) value for each one of one or more pairs of transmit antennas; and
determining a CQI value based on the computed effective SNR value for each one of one or more pairs of transmit antennas.

16. The method of claim 15, wherein the identified one or more pairs comprises at least two pairs of transmit antennas, and wherein said determining the CQI value comprises averaging computed SNR values over the at least two pairs of transmit antennas to generate a global effective SNR.

17. The method of claim 15, wherein computing the one or more SINR values comprises summing channel gains over a portion of an effective channel corresponding to the respective one of the one or more pairs of transmit antennas.

18. The method of claim 17, wherein said summing the channel gains comprises, for each transmission instance received at the receiver circuitry, summing channel gains over a first column of the effective channel and a third column of the effective channel to generate a first SINR value and summing channel gains over a second column of the effective channel and a fourth column of the effective channel to generate a second SINR value.

19. The method of claim 15, wherein said computing the effective SNR value for each one of the one or more pairs of transmit antennas comprises mapping the one or more SINR values for a plurality of transmission instances received at the receiver circuitry to the effective SNR value.

20. The method of claim 15, wherein the transmission system implements at least one of a space-time block coding (STBC) scheme, a space-frequency block coding (SFBC) scheme, and a frequency-switched transmit diversity (FSTD) scheme.

* * * * *